United States Patent
Huang et al.

(10) Patent No.: US 8,665,933 B2
(45) Date of Patent: Mar. 4, 2014

(54) DATA TRANSMITTING AND RECEIVING METHOD AND DEVICE FOR COMMUNICATION AND SYSTEM THEREOF

(75) Inventors: Liang-Wei Huang, Hsinchu (TW); Mei-Chao Yeh, Kaohsiung (TW); Tzu-Han Hsu, Kaohsiung (TW); Li-Han Liang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 212 days.

(21) Appl. No.: 13/117,699

(22) Filed: May 27, 2011

(65) Prior Publication Data

US 2011/0299578 A1     Dec. 8, 2011

(30) Foreign Application Priority Data

Jun. 2, 2010   (TW) ................. 99117842 A

(51) Int. Cl.
*H04B 1/38*     (2006.01)
(52) U.S. Cl.
USPC ........... 375/222; 375/350; 375/296; 455/131; 455/462; 455/72
(58) Field of Classification Search
USPC ............. 375/222, 232, 350; 455/72, 462, 434
See application file for complete search history.

(56) References Cited

U.S. PATENT DOCUMENTS

| | | | |
|---|---|---|---|
| 6,038,430 A * | 3/2000 | Thomson et al. | 455/72 |
| 2005/0105641 A1* | 5/2005 | Cheung et al. | 375/296 |
| 2008/0200136 A1* | 8/2008 | Taylor | 455/131 |
| 2012/0076250 A1* | 3/2012 | Kravtsov | 375/350 |

\* cited by examiner

*Primary Examiner* — Eva Puente
(74) *Attorney, Agent, or Firm* — McClure, Qualey & Rodack, LLP

(57) ABSTRACT

A data transmitting and receiving device and method are used for saving powers and maintaining the connection quality, stability and continuous link. The method includes the step of gradually adjusting the de-emphasis of the signal transmitted from the data transmitting and receiving device according to the setting value thereof. The method also includes the steps of transmitting training sequence signal with an amplitude and the default de-emphasis by the data transmitting and receiving device to the remote device, receiving the training sequence signal from the remote device, thereby the channel attenuation is estimated using the method, and a better de-emphasis is set up. Then, the data transmitting and receiving device gradually increases the amplitude of the training sequence signal and re-transmits it until the remote device receives the training sequence signal transmitted therefrom.

18 Claims, 9 Drawing Sheets

DATA TRANSMITTING AND RECEIVING METHOD AND DEVICE FOR COMMUNICATION AND SYSTEM THEREOF

The application claims the benefit of Taiwan Patent Application No. 099117842, filed on Jun. 2, 2010, in the Taiwan Intellectual Property Office, the disclosures of which are incorporated herein in their entirety by reference.

FIELD OF THE INVENTION

The invention relates to a data transmitting and receiving method and device for communication and a system thereof, more particularly to a data transmitting and receiving method and device having a function of adjusting the de-emphasis for communication and a system thereof.

BACKGROUND OF THE INVENTION

Due to the demands of the developments for improving the signal quality and the transmitting rate of the data transmitting devices, the buses between the devices include ISA, EISA, VESA and Micro Channel, as the first generation buses, PCI, AGP, and PCI-X, as the second generation buses and PCI-express as the third generation of the I/O bus with the high performance. The buses are commonly used for interconnecting the peripheral devices of the computing and communicating platform and widely applied to computing mobiles, desktop computers, workstations, servers, embedded computers and the communicating platforms.

The PCI express architecture not only maintains the advantages of the previous two generations of the bus architectures but introduces the new technology of the computer architectures. Unlike the parallel bus architectures, PCI express uses the serial and point-to-point connection type for communicating between two devices. Therefore, the rate for transmitting and receiving data on the buses can be increased considerably. Currently the rate for transmitting and receiving data on PCI express bus can reach 2.5 Gbits per second. Since the transmitting amplitude of the data on PCI express bus should consider length of the transmission line, loss of the signals and different amplitude which the host terminal requires, the dimension of the output amplitude defined in the standard is specifically set. However, under most circumstances, it is in fact unnecessary to have an output amplitude with large dimension to receive and transmit the signals. Therefore, outputting the large amplitude signals represents wasting the unnecessary energy. Nevertheless, if the decreased signal amplitude can not be detected automatically, the signal with micro-amplitude would lead to the risk of disconnection.

In addition, the transmission in serial connection system is a one-way transmission, which means that the transmission path and the reception path are not configured in the same route path. Although the de-emphasis of the transmitter can be adjusted to improve the connection quality, there is no way of knowing the relationship between the receiving quality of the device terminal and the de-emphasis of the host terminal so that the poor quality can not be known once it occurs. If whether the number of Negative Acknowledge (NAK) returned from the device terminal is higher than a threshold is determined to decide whether the de-emphasis of the host terminal should be changed, the adjustment is blindly tested although the connection quality might be improved occasionally. FIG. 1 schematically illustrates a method for improving the connection quality disclosed in the U.S. Pat. No. 7,502,338. The de-emphasis is dynamically adjusted to change the setting of the de-emphasis in step S12-S15. However, there is no way of knowing the property of the circuit board or the device terminal. The connection to the device terminal might be broken if the de-emphasis is adjusted during data transmitting, which might be the condition that a bad setting of the de-emphasis is adjusted to be a worse setting of the de-emphasis. Nevertheless, the disconnection is not allowed during data transmitting in the PCI express architecture. Therefore, the serious consequences of the disconnection might not be prevented.

Therefore, to overcome the drawbacks from the prior art and to meet the present needs, the Applicant dedicated in considerable experimentation and research, and accomplished the "Data Transmitting and Receiving Method and Device for Communicating and System Thereof" of the present invention, wherein the receivable amplitude of the device terminal can be dynamically detected to gradually adjust the transmitted power of the host terminal and the setting value of the receiver of the host terminal can be detected to gradually adjust the de-emphasis to improve the receiving quality of the device terminal. The present invention is briefly described as follows.

SUMMARY OF THE INVENTION

To solve the above drawbacks, the purpose of the present invention is that an automatic adjusting method is used for detecting the setting value of the receiver at any time to keep the stable connection quality to prevent from disconnecting for satisfying the users' demands. In addition, the present invention provides a power saving method to reduce the power consumption for saving the cost in the connection initialization state. Therefore, the present invention provides the automatic adjusting method and the power saving method simultaneously to achieve the data transmitting and receiving method of the present invention.

According to the first aspect of the present invention, a data transmitting and receiving device communicating with a remote device through a channel therebetween is provided. The device includes a de-emphasis generator generating a de-emphasis; an output unit coupled to the de-emphasis generator and transmitting an output signal to the remote device according to the de-emphasis; an input unit receiving an input signal from the remote device; an equalizer coupled to the input unit and generating an equalization according to the input signal; and a processing unit coupled to the de-emphasis generator and the equalizer and computing a channel attenuation of the channel according to the equalization, wherein the de-emphasis generator adjusts the de-emphasis according to the channel attenuation.

Preferably, the channel attenuation is a sum of the amplitude of a predetermined de-emphasis and the amplitude of the equalization, and the amplitude of the predetermined de-emphasis is 3.5 dB.

Preferably, the de-emphasis generator adjusts the de-emphasis according to a range formed by a convergence value and the de-emphasis, the convergence value is equal to the channel attenuation multiplied by a proportional value, and the proportional value is not larger than 1.

Preferably, the de-emphasis generator adjusts the de-emphasis according to a first equation, the first equation is R×A−D, R is a proportional value being not larger than 1, A is the channel attenuation, and D is the de-emphasis.

Preferably, the data transmitting and receiving device determines whether the remote device is another data transmitting and receiving device according to a second equation being $A-E-D_p$, A is the channel attenuation, E is the equalization, and $D_p$ is a predetermined de-emphasis.

Preferably, the output signal has a first amplitude, the input signal is a training signal, and the output unit transmits the output signal to the remote device according to a second amplitude being larger than the first amplitude if the input unit does not receive the training signal.

According to the second aspect of the present invention, a connection system is provided. The connection system includes a first terminal and a second terminal. The first terminal further includes a first receiving apparatus generating a first receiving property; and a first processing unit coupled to the first receiving apparatus. The second terminal communicating with the first terminal through a channel further includes a second receiving apparatus generating a second receiving property. Furthermore, the first receiving property is substantially equal to the second receiving property and the first processing unit computes a channel attenuation of the channel according to the first receiving property.

According to the third aspect of the present invention, a data transmitting and receiving method for a communicating system is provided. The communicating system includes a first terminal, a second terminal and a channel between the first terminal and the second terminal. The method includes steps of generating a de-emphasis in the first terminal; generating an equalization in the first terminal; computing a channel attenuation of the channel according to the equalization; adjusting the de-emphasis according to the channel attenuation; and transmitting an output signal to the second terminal according to the adjusted de-emphasis.

Preferably, the method further includes steps of determining whether an input signal transmitted by the second terminal is received; increasing an amplitude of the output signal transmitted by the first terminal and performing the determining step if a result of the determining step is a "no"; and generating the equalization by the received input signal.

Preferably, the method further includes a step of determining whether a total number of Negative Acknowledge (NAK) received within a predetermined time is higher than a first threshold, wherein the total number of NAK represents how many times the second terminal send a response for a bad signal reception to the first terminal, and the de-emphasis is adjusted again to approach a convergence value if the total number of NAK is higher than the first threshold.

Preferably, the method further includes steps of adjusting the de-emphasis according to a range formed by a convergence value and the de-emphasis; performing a test for a Negative Acknowledge (NAK) frequency; and ceasing to adjust the de-emphasis while in one of two states being that the NAK frequency is less than a second threshold and the de-emphasis is equal to the convergence value, wherein the convergence value is equal to the channel attenuation multiplied by the proportional value being not larger than 1.

Preferably, the method further includes a step of adjusting the de-emphasis to approach the convergence value if the NAK frequency is decreasing.

The above aspects and advantages of the present invention will become more readily apparent to those ordinarily skilled in the art after reviewing the following detailed descriptions and accompanying drawings, in which:

BRIEF DESCRIPTION OF THE DRAWINGS

FIG. 2(a) is a diagram which schematically illustrates a connection between a transmitter of the host terminal and a receiver of the device terminal;

FIG. 2(b) is a diagram which schematically illustrates a connection between a receiver of the host terminal and a transmitter of the device terminal;

FIG. 3(a) is a diagram which schematically illustrates a connection between a transmitter of the host terminal and a receiver of the device terminal;

FIG. 3(b) is a diagram which schematically illustrates a signal having inter-symbol interference;

FIG. 3(c) is a diagram which schematically illustrates a signal transmitted from a transmitter having a function of adjusting the de-emphasis;

FIG. 3(d) is a diagram which schematically illustrates a signal received by a receiver having a function of adjusting the equalization;

FIG. 8(a) is a diagram which schematically illustrates a process of setting a new de-emphasis according to the present invention; and FIG. 8(b) is a diagram which schematically illustrates a process of setting the amplitude after setting the new de-emphasis according to the present invention.

DETAILED DESCRIPTION OF THE PREFERRED EMBODIMENT

The present invention will now be described more specifically by the following embodiments. However, it is to be noted that the following descriptions of preferred embodiments of this invention are presented herein for the purposes of illustration and description only; it is not intended to be exhaustive or to be limited to the precise form disclosed.

Figure 1:
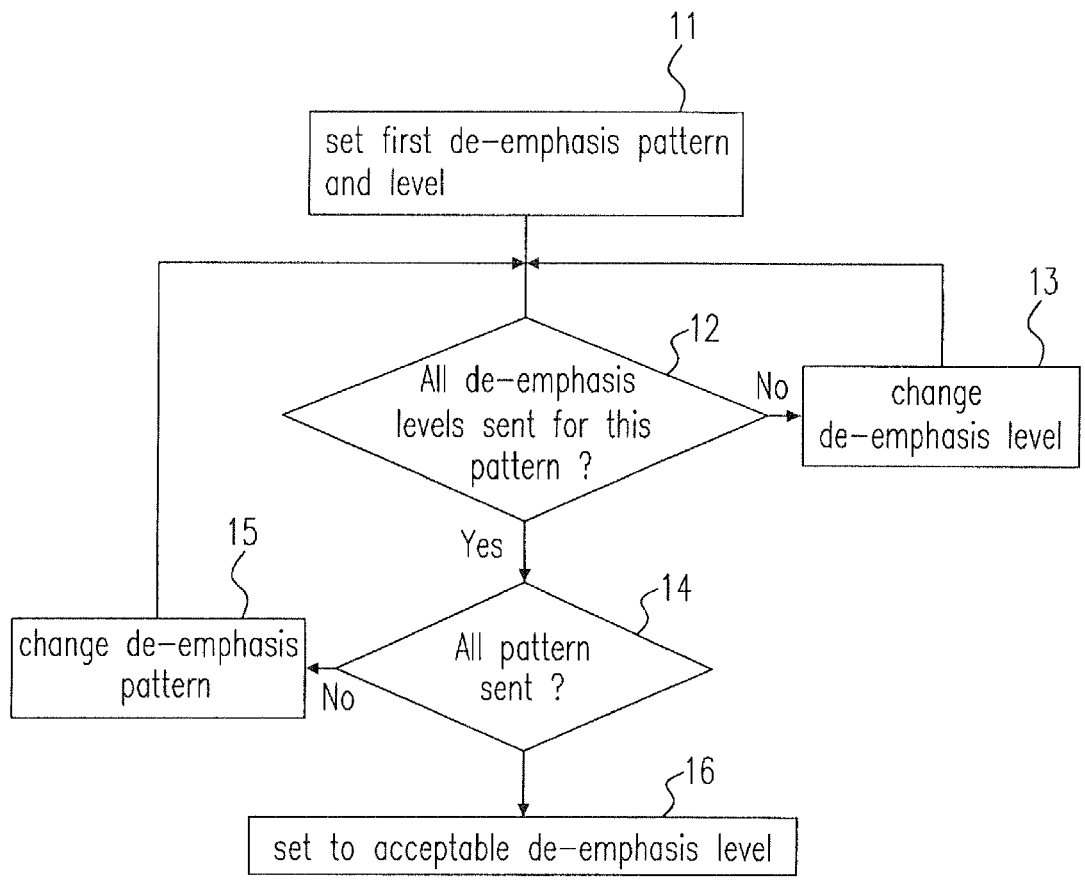
FIG. 1 is a diagram which schematically illustrates a method for improving the connection quality in the prior art.
Figure 2A:
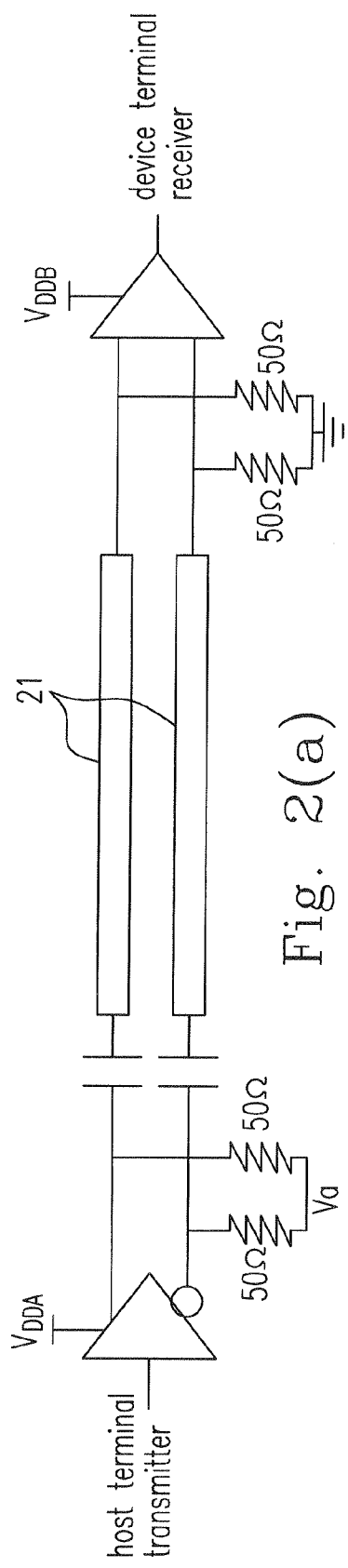
FIGS. 2(a)-2(b) are diagrams which schematically illustrate a connection between two nodes according to the present invention.
Figure 2B:
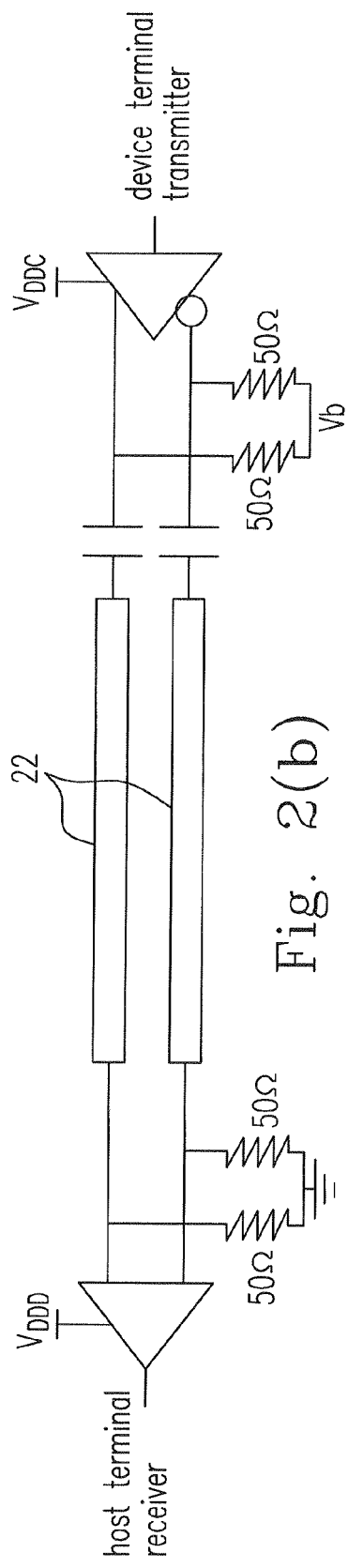
Figure 3A:
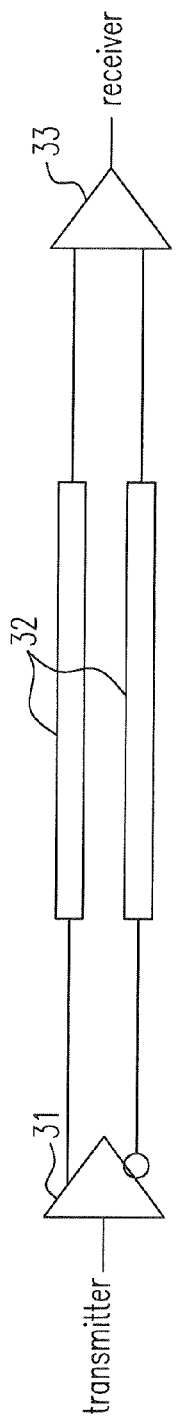
FIGS. 3(a)-3(d) are diagrams which schematically illustrate a transmitting waveform of the signal transmitted between the transmitter of the host terminal and the receiver of the device terminal.
Figure 3B:
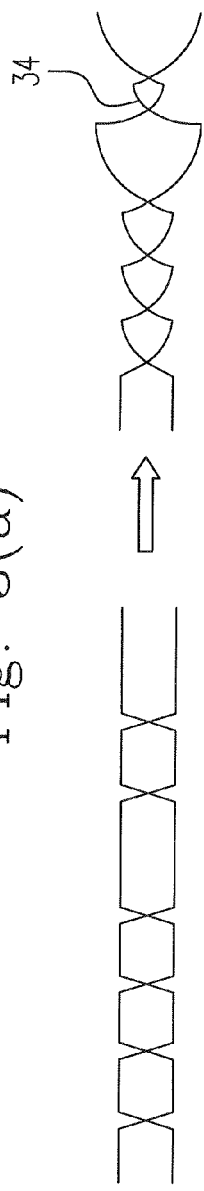
Figure 3C:
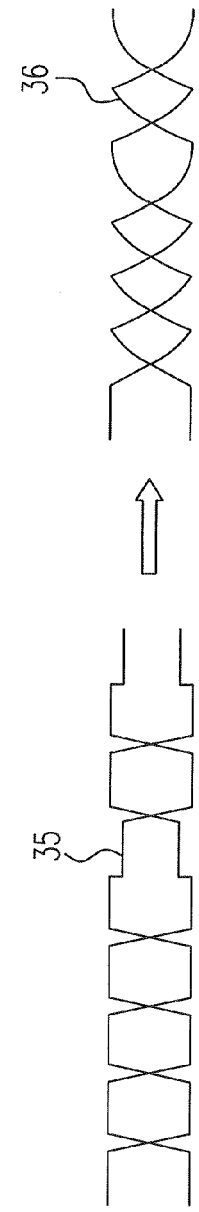
Figure 3D:
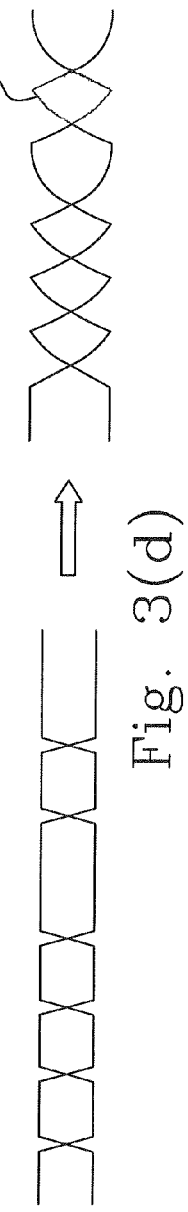

FIG. 2 schematically illustrate a connection between two nodes according to the present invention, wherein FIG. 2(a) schematically illustrates a connection between a transmitter of the host terminal and a receiver of the device terminal and FIG. 2(b) schematically illustrates a connection between a receiver of the host terminal and a transmitter of the device terminal, wherein the channels 21 and 22 are the PCB traces or cables. Although the connection system of the present invention is the one-way transmission system, it includes a couple of one-way transmission lines. Usually, there are a couple of transmission lines to be arranged as parallel cables tracing together on the printed circuit board (PCB). Therefore, the quality of the signal received by the host terminal is similar to that of the signal received by the receiver of the device terminal. Thus, the channel attenuation of the couple of transmission lines would be similar to or further equal to each other. The de-emphasis of the transmitter of the host terminal can be adjusted according to the receiver thereof to further improve the receiving quality of the receiver of the device terminal. For example, in the PCI-express architecture, the amplitude of the de-emphasis in the respective transmitters of the host terminal and the device terminal is predetermined to be equal to 3.5 dB due to the requirements of the standards. If the receiving quality is in the best condition when the amplitude of the equalization in the equalizer of the receiver of the host terminal is increased to equal to 6.5 dB, the attenuation of the channels 21 and 22 can be reasonably inferred to be 10 dB which is computed by adding 3.5 dB to 6.5 dB.

FIG. 3 schematically illustrate a transmitting waveform of the signal transmitted between the transmitter of the host terminal and the receiver of the device terminal. FIG. 3(a) schematically illustrates a connection between a transmitter 31 of the host terminal and a receiver 33 of the device terminal, wherein a channel 32 is the PCB traces or cables for connecting the two terminals. FIG. 3(b) schematically illustrates a signal having inter-symbol interference. If the continuous signals with the same polarization are transmitted before a signal with the opposite polarization, the signal with the opposite polarization is hard to be detected since the inter-symbol interference, which influences the signal 34, is easily caused by a frequency attenuation formed by the channel attenuation. FIG. 3(c) schematically illustrates a signal transmitted from a transmitter having a function of adjusting the de-emphasis. The de-emphasis adjustment is performed on the continuous signals with the same polarization so that the signal 34 having inter-symbol interference can be returned to the normal signal 36. FIG. 3(d) schematically illustrates a signal received by a receiver having a function of adjusting the equalization. Although the signal 34 having inter-symbol interference can be returned to the normal signal 36 by the equalizer of the receiver, the noise would be increased due to the equalizer of the receiver. Therefore, it is a better way to use the de-emphasis adjustment of the transmitter for solving the above problem.

Figure 4:
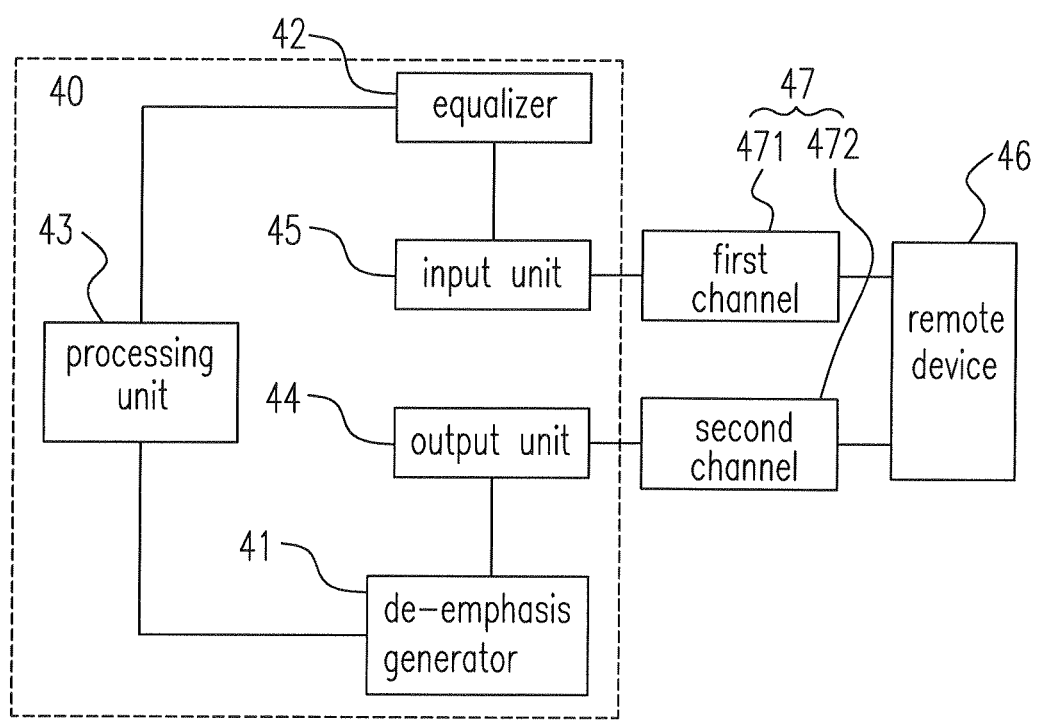
FIG. 4 is a diagram which schematically illustrates a data transmitting and receiving device according to a preferred embodiment of the present invention.

FIG. 4 schematically illustrates a data transmitting and receiving device 40 according to a preferred embodiment of the present invention. The data transmitting and receiving device 40 includes a de-emphasis generator 41, an equalizer 42 and a processing unit 43, wherein the de-emphasis generator 41 is used for generating the de-emphasis, the equalizer 42 is used for generating the equalization based on the input signals, and the processing unit 43 is coupled to the de-emphasis generator 41 and the equalizer 42 and used for adding the amplitude of the predetermined de-emphasis and the amplitude of the equalization together to obtain the channel attenuation. The amplitude of the predetermined de-emphasis can be 3.5 dB. After the channel attenuation is computed, the de-emphasis generator 41 can generate a first new de-emphasis based on the channel attenuation. In other embodiment, the de-emphasis generator 41 can be controlled to generate the de-emphasis and the first new de-emphasis by the processing unit 43.

Preferably, the data transmitting and receiving device 40 can further include an output unit 44 and an input unit 45, wherein the output unit 44 is coupled to the de-emphasis generator 41 and used for transmitting an output signal with the output amplitude, and the input unit 45 is coupled to the equalizer 42 and used for receiving an input signal with the input amplitude. In order to prevent inter-symbol interference (ISI), the output amplitude of the output signal can be adjusted by the de-emphasis generator 41 and the input amplitude of the input signal can be adjusted by the equalizer 42. In addition, in order to achieve the power saving in the present invention, the output amplitude should be controlled and the processing unit 43 can be used for controlling the output amplitude.

Preferably, the data transmitting and receiving device 40 is communicated with the remote device 46 through a channel 47, wherein the channel 47 further includes a first channel 471 connected with the input unit 45 and the second channel 472 connected with the output unit 44. Since the first channel 471 and the second channel 472 are arranged in parallel to form the channel 47, the state of the signal received by the data transmitting and receiving device 40 can be similar to the state of the signal received by the remote device 46. That is to say that the channel attenuation of the first channel 471 can be similar to or further equal to the channel attenuation of the second channel 472. When the data transmitting and receiving method of the present invention is performed on the data transmitting and receiving device 40 and the remote device 46, the predetermined de-emphasis is used for the connection test by both of the devices at first. From the point of view of the data transmitting and receiving device 40, a signal would be transmitted from the output unit 44 to the remote device 46 according to the predetermined de-emphasis. Moreover, the equalization would be generated by the data transmitting and receiving device 40 according to the input signal when the data transmitting and receiving device 40 receives the input signal with the same predetermined de-emphasis transmitted from the remote device 46. As the predetermined de-emphases of both devices are substantially the same to each other and the channel attenuations of the first channel 471 and the second channel 472 are substantially the same to each other, the equalizations of both devices are substantially the same to each other. Therefore, the computation of the channel attenuation can be changed from adding the amplitude of the equalization of the remote device 46 and the amplitude of the de-emphasis of the data transmitting and receiving device 40 together to adding the amplitude of the equalization of the data transmitting and receiving device 40 and the amplitude of the de-emphasis of the data transmitting and receiving device 40 together.

In the above embodiments, the first new de-emphasis can be generated according to a proportional value R by the de-emphasis generator 41, wherein the proportional value R is not larger than 1. Preferably, the proportional value R can be 1, ½, ⅓, ¼, ⅔, and so on. Preferably, the proportional value is further larger than 0, i.e. 0<R≤1.

In the above embodiments, a convergence value can be first generated to be a basis for selecting the first new de-emphasis by the de-emphasis generator 41. The convergence value is preferably equal to the channel attenuation A multiplied by the proportional value R (i.e. R×A). In order to prevent the de-emphasis from changing violently so that the connection is lost, the invention provides a range formed by the convergence value and the de-emphasis to adjust the de-emphasis within the range and the first new de-emphasis can be gradually adjusted based on the de-emphasis. After the first new de-emphasis is generated, a test for a Negative Acknowledge (NAK) frequency is preferably performed by the data transmitting and receiving device 40 in order to determine whether the connection quality is improved or not. If the NAK frequency is increased so that the connection quality is decreased and the adjustment direction of the first new de-emphasis is incorrect, the de-emphasis generator 41 should stop adjusting and return to the previous de-emphasis. If the NAK frequency is decreased so that the connection quality is improved and the adjustment direction of the first new de-emphasis is correct, the de-emphasis generator 41 can keep adjusting the de-emphasis to generate the second new de-emphasis to further improve the connection quality, wherein the second new de-emphasis is selected from the other range formed by the first new de-emphasis and the convergence value to further approach the convergence value. If one of two states that the NAK frequency is less than a threshold after the first new de-emphasis is adjusted and that the first new de-emphasis is equal to the convergence value occurs, the first new de-emphasis is selected for transmitting the subsequent data by the de-emphasis generator 41. In the above embodiments, the test of the NAK frequency is preferably performed by the processing unit 43.

In an embodiment, the first new de-emphasis can be directly determined to be equal to the channel attenuation. In other words, the first new de-emphasis can be directly decided to be equal to the specific convergence value whose proportional value R is equal to 1. Therefore, the channel attenuation is completely compensated by the de-emphasis to prevent the noise amplification generated by the equalization. If the remote device 46 is not another data transmitting and receiving device of the present invention, the remote device 46 would only use the predetermined de-emphasis to transmit the signal. Therefore, the equalization of the data transmitting and receiving device 40 would be a constant value being $A_t-D_p$, wherein $A_t$ is the original channel attenuation and $D_p$ is the predetermined de-emphasis. When the connection is continued, the de-emphasis can be adjusted to increase if the equalization is changed to be higher than the constant value $(A_t-D_p)$, which the channel attenuation is increased so the channel attenuation is not totally compensated by the de-emphasis. Otherwise, the de-emphasis can be adjusted to decrease if the equalization is changed to be smaller than the constant value. Therefore, the equalization can approach a final value and the final value is equal to $A-D_p$ in the embodiment.

In the above embodiments, the de-emphasis of the data transmitting and receiving device 40 and the de-emphasis of the remote device 46 would be adjusted to be equal to the channel attenuation so that both of the equalizations thereof are equal to 0 if the remote device 46 is another data transmitting and receiving device of the present invention. However, there is none of adjustable values to increase the de-emphasis when the connection quality is poor. In order to prevent the above condition, the new de-emphasis is preferably determined to equal to the channel attenuation multiplied by the proportional value (i.e. R×A). Therefore, the data transmitting and receiving device 40 and the remote device 46 can adjust according to the pre-reserved adjustable value if the de-emphasis thereof should be adjusted to increase.

In the above embodiments, the data transmitting and receiving device 40 determine whether the de-emphasis should be increased or decreased according to a first equation being R×A−D, wherein R is a proportional value being not larger than 1, A is the channel attenuation, and D is the de-emphasis. Preferably, the proportional value R is further larger than 0, i.e. 0<R≤1. In other words, the first equation is the difference between the convergence value and the de-emphasis. When the value of the first equation is larger than 0, which the convergence value is larger than the de-emphasis, the de-emphasis would have the adjustable value to increase for generating the first new de-emphasis larger than the de-emphasis. When the value of the first equation is smaller than 0, which the convergence value is smaller than the de-empha-sis, the de-emphasis would have the adjustable value to decrease for generating the first new de-emphasis smaller than the de-emphasis.

In the above embodiments, the data transmitting and receiving device 40 can determine whether the remote device 46 is another data transmitting and receiving device of the present invention according to a second equation. If the remote device 46 is another data transmitting and receiving device of the present invention, the de-emphasis thereof would be adjusted to generated a first new de-emphasis which is different from the predetermined de-emphasis so that the equalization of the data transmitting and receiving device 40 would be adjusted corresponding to the first new de-emphasis of the remote device 46. The second equation is $A-E-D_p$, which is the difference between the de-emphasis of the remote device 46 and the predetermined de-emphasis thereof, wherein A is the channel attenuation, E is the equalization, and $D_p$ is a predetermined de-emphasis. When the value of the second equation is not substantially equal to 0, which means that the de-emphasis of the remote device 46 is adjusted to be different from the predetermined de-emphasis, the remote device is another data transmitting and receiving device. When the value of the second equation is substantially equal to 0, which means that the de-emphasis of the remote device 46 is substantially equal to the predetermined de-emphasis thereof, it can not be determined that the remote device 46 is not another data transmitting and receiving device of the present invention. Since the adjusted de-emphasis of the remote device 46 may be equal to the predetermined de-emphasis, it is hard to use the second equation for directly determining the remote device 46 is not another data transmitting and receiving device of the present invention. However, the latter situation can be processed by using the second equation to determine after the de-emphasis is further adjusted. Moreover, the channel attenuation is computed to be equal to the sum of the amplitude of a predetermined de-emphasis of the data transmitting and receiving device 40 and the amplitude of the equalization thereof before the de-emphasis thereof is adjusted to be different from the predetermined de-emphasis in order that the second equation can be performed normally. Therefore, the predetermined de-emphasis of the data transmitting and receiving device 40 should be the same as the predetermined de-emphasis of the remote device 46 so that the amplitude of the predetermined de-emphasis is preferably equal to 3.5 dB.

In the above embodiments, the output signal is transmitted with the first amplitude by the output unit 44 to the remote device 46. If the output signal is received by the remote device 46, an input signal, such as a training signal, transmitted thereby is returned to the input unit 45. If the training signal is not received by the input unit 45, the output signal is re-transmitted with the second amplitude larger than the first amplitude to the remote device 46 by the output unit 44.

Figure 5:
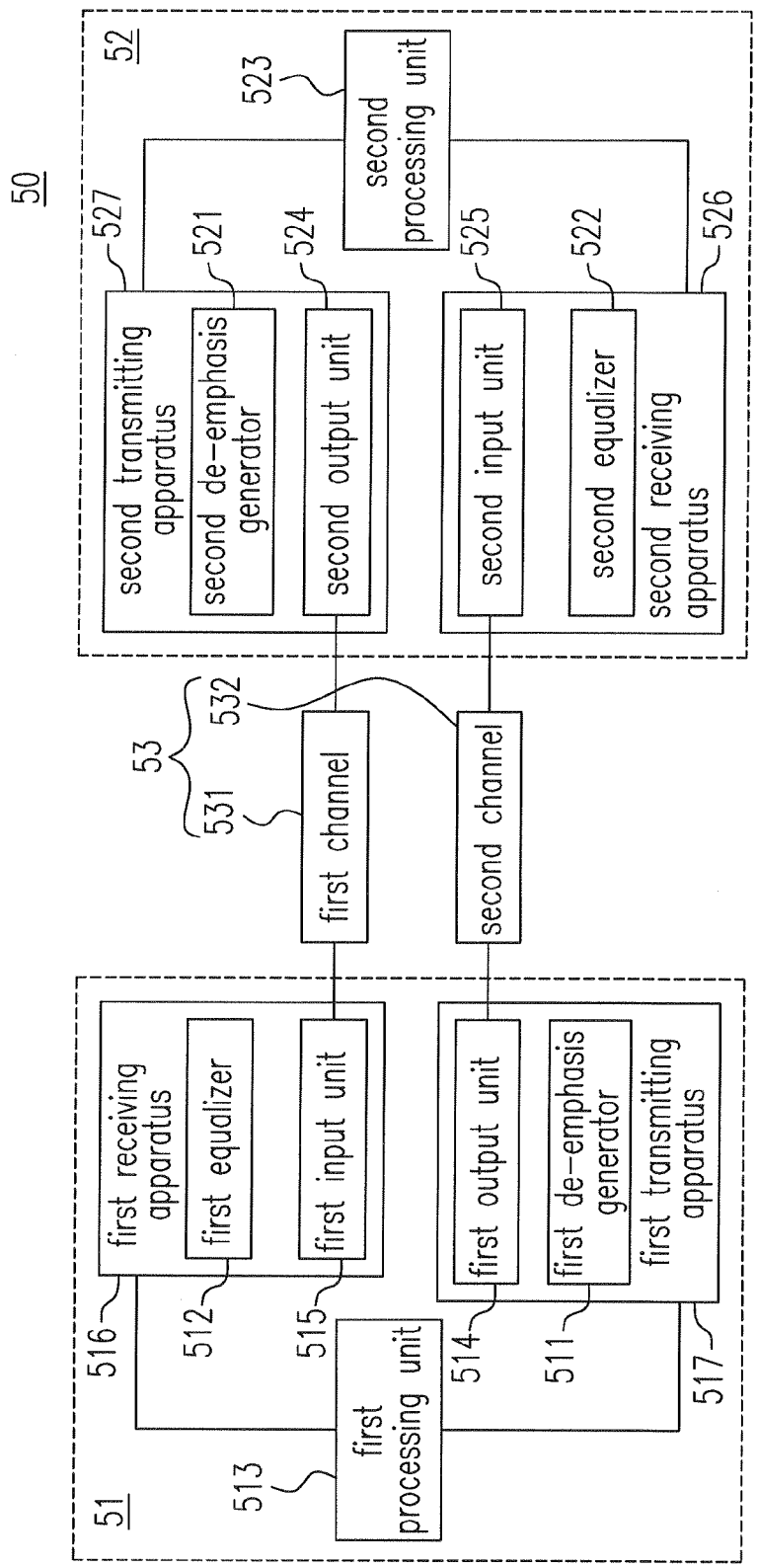
FIG. 5 is a diagram which schematically illustrates a communication system according to a preferred embodiment of the present invention.

FIG. 5 schematically illustrates a communicating system 50 according to a preferred embodiment of the present invention. The communicating system 50 includes a first terminal 51, a second terminal 52 and a channel 53. The first terminal 51 includes a first receiving apparatus 516, a first transmitting apparatus 517 and a first processing unit 513. The second terminal includes a second receiving apparatus 526, a second transmitting apparatus 527 and a second processing unit 523. The first terminal 51 is coupled with the second terminal 52 by the channel 53 for communicating with each other. In addition, the first receiving apparatus 516 and the first transmitting apparatus 517 are coupled to the first processing unit 513 and the second receiving apparatus 526 and the second transmitting apparatus 527 are coupled to the second processing unit 523.

Preferably, the first receiving apparatus 516 includes a first input unit 515 and a first equalizer 512. The first transmitting apparatus 517 includes a first output unit 514 and a first de-emphasis generator 511. The second receiving apparatus 526 includes a second input unit 525 and a second equalizer 522. The second transmitting apparatus 527 includes a second output unit 524 and a second de-emphasis generator 521.

Preferably, the first equalization as a first receiving property is generated by the first equalizer 512 of the first receiving apparatus 516. The second equalization as a second receiving property is generated by the second equalizer 522 of the second receiving apparatus 526. The first de-emphasis as a first transmitting property is generated by the first de-emphasis generator 511 of the first transmitting apparatus 517. The second de-emphasis as a second transmitting property is generated by the second de-emphasis generator 521 of the second transmitting apparatus 527.

Preferably, the channel 53 includes a first channel 531 and a second channel 532. The first channel 531 is utilized to couple the first input unit 515 with the second output unit 524. The second channel 532 is utilized to couple the second input unit 525 with the first output unit 514.

Preferably, the present invention is used for the wire transmission. The first channel 531 and the second channel 532 are arranged together as parallel cables to form the channel 53 so the quality of the signal received by the first terminal 51 is similar to the quality of the signal received by the second terminal 52. In other words, the channel attenuation of the first channel 531 is similar to or further equal to the channel attenuation of the second channel 532. Therefore, since the predetermined de-emphasis is used for testing the communication by both of the terminals, the first equalization is substantially equal to the second equalization in the condition that the channel attenuation of the first channel 531 is substantially equal to the channel attenuation of the second channel 532 so that the second equalization can be estimated according to the first equalization by the first processing unit 513. Thus, the channel attenuation of the first channel 531 can be computed as the channel attenuation of the channel 53 according to the estimated second equalization since the first channel attenuation is equal to the sum of the amplitude of the first de-emphasis and the amplitude of the second equalization.

Figure 6:
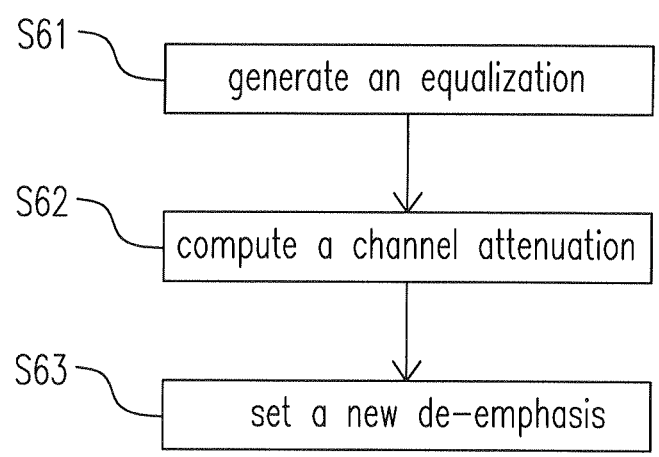
FIG. 6 is a diagram which schematically illustrates a process for the data transmitting and receiving method according to a preferred embodiment of the present invention.

The data transmitting and receiving method of the present invention is related to a method for automatic adjusting the de-emphasis and saving the power. FIG. 6 schematically illustrates an automatic adjusting method for a communicating system according to a preferred embodiment of the present invention, wherein the communicating system includes a first terminal and a second terminal connected with each other through a channel. The communicating system can include the data transmitting and receiving device 40 and the remote device 46 which are used respectively as the first terminal and the second terminal. The data transmitting and receiving device 40 is coupled to the remote device 46 by the channels 471 and 472 and the channels 471 and 472 are arranged together as parallel cables so that the channel attenuation and the external interference of the channel 471 are substantially equal to those of the channel 472.

Although the data transmitting and receiving device 40 is utilized to be the first terminal and the remote device 46 is utilized to be the second terminal in the following descriptions, the present invention is not limited to this embodiment. If the data transmitting and receiving method of the present invention can be performed in the remote device 46, it can be regard as the first terminal and the data transmitting and receiving device 40 can be regarded as the second terminal.

First, the input signal is received to generate an equalization (E) by the data transmitting and receiving device 40 (S61). Then, a channel attenuation A is computed by the sum of the amplitude of the de-emphasis with which the output signal is transmitted and the amplitude of the equalization (S62). The de-emphasis can be adjusted to generate a new de-emphasis according to the computed channel attenuation by the data transmitting and receiving device 40 (S63) and the output signal can be transmitted to the remote device 46 according to the new de-emphasis. The new de-emphasis can be generated according a proportional value R in the step S63, wherein the proportional value R can not be larger than 1. Preferably, the proportional value R can be equal to 1, ½, ⅓, ¼, ⅘ and so on. Preferably, the proportional value is further larger than 0, i.e. $0 < R \le 1$.

In the above embodiments, a convergence value can be generated to be a reference value of the new de-emphasis according to the channel attenuation before generating the new de-emphasis. The convergence value is preferably equal to R×A. The present invention provides a range formed by the convergence value and the de-emphasis to generate the new de-emphasis within the range and the new de-emphasis is gradually adjusted based on the de-emphasis. After the new de-emphasis is generated, a test for a Negative Acknowledge (NAK) frequency is preferably performed in the present invention. If the NAK frequency is less than a threshold after the de-emphasis is adjusted or the new de-emphasis is equal to the convergence value, the new de-emphasis is selected for transmitting the subsequent data. In addition, the previous de-emphasis should be returned if the NAK frequency is increased, which means that the adjustment direction of the new de-emphasis is incorrect. If the NAK frequency is decreased, which means that the adjustment direction of the new de-emphasis is correct, the new de-emphasis can be further adjusted to approach the convergence value.

In an embodiment, the new de-emphasis can be directly determined to be equal to the channel attenuation. In other words, the new de-emphasis can be directly determined to be equal to the specific convergence value whose proportional value R is equal to 1. Therefore, the channel attenuations of the channels 471 and 472 are completely compensated by the de-emphasis to prevent the noise amplification generated by the equalization. When the automatic adjusting method is performed in the recovery state, the amplitude of the new de-emphasis is the sum of the amplitude of the predetermined de-emphasis and the amplitude of the equalization, wherein the amplitude of the predetermined de-emphasis is equal to 3.5 dB according to the base specification. Therefore, the amplitude of the new de-emphasis is equal to E+3.5 dB. If the data transmitting and receiving method only can be performed in the data transmitting and receiving device 40, the remote device 46 would transmit the signal only with the predetermined de-emphasis. Therefore, the equalization of the data transmitting and receiving device 40 would be a constant value being $A_i - D_p$, wherein $A_i$ is the original channel attenuation and $D_p$ is the predetermined de-emphasis. When the automatic adjusting method is performed, the de-emphasis can be adjusted to increase if the equalization is changed to be higher than the constant value ($A_i - D_p$), which means that the channel attenuation is increased so the channel attenuation is not totally compensated by the de-emphasis. Otherwise, the de-emphasis can be adjusted to decrease if the equalization is changed to be smaller than the constant value.

Therefore, the equalization can approach a final value and the final value is equal to $A-D_p$ in the embodiment.

In the above embodiments, the de-emphasis of the data transmitting and receiving device 40 and the de-emphasis of the remote device 46 would be adjusted to be equal to the channel attenuation so that the equalizations thereof are equal to 0 if the data transmitting and receiving method of the present invention can be performed thereby. However, there is no adjustable value for further increasing the de-emphasis when the connection quality is poor. In order to prevent the above condition, the new de-emphasis is preferably determined to equal to the channel attenuation multiplied by the proportional value R. Therefore, the data transmitting and receiving device 40 and the remote device 46 can adjust according to the pre-reserved adjustable value if the de-emphasis thereof should be adjusted to increase.

Preferably, the data transmitting and receiving device 40 and the remote device 46 respectively include a transmitter, as an output unit, and a receiver, as an input unit. The transmitter of the data transmitting and receiving device 40 is coupled with the receiver of the remote device 46 by the second channel 472. The transmitter of the remote device 46 is coupled with the receiver of the data transmitting and receiving device 40 by the first channel 471. The channel attenuations of the first channel 471 and the second channel 472 are similar or further equal to each other since the first channel 471 and the second channel 472 are arranged as parallel cables. Therefore, the de-emphasis of the transmitter of the data transmitting and receiving device 40 is adjusted according to the channel attenuation computed by the equalization of the receiver and the de-emphasis of the transmitter thereof based on the data transmitting and receiving method of the present invention to improve the receiving quality of the receiver of the remote device 46.

Figure 7:
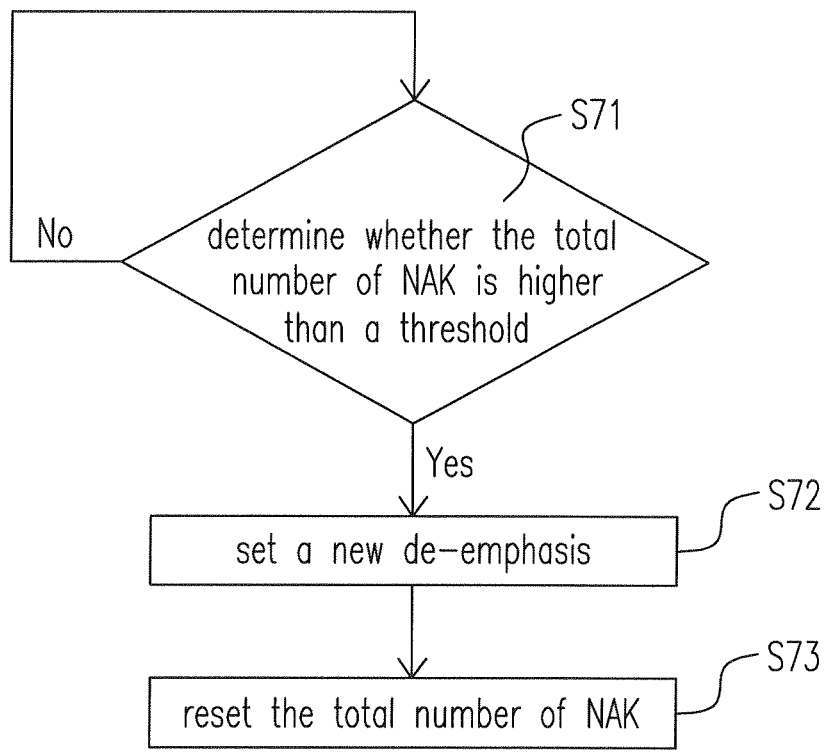
FIG. 7 is a diagram which schematically illustrates a process for the data transmitting and receiving method according to a preferred embodiment of the present invention.

Preferably, the automatic adjusting method can be used in the recovery state to improve the connection quality of the electronic device. Furthermore, the automatic adjusting method can be used for adjusting the connection quality again when the connection quality is poor. FIG. 7 schematically illustrates the automatic adjusting method according to a preferred embodiment of the present invention. The automatic adjusting method in this preferred embodiment can be used when the data transmitting and receiving device 40 has been communicated with the remote device 46. First, whether the total number of the NAK received within a predetermined time is higher than a threshold is determined by the data transmitting and receiving device 40 (S71), wherein the total number of NAK represents how many times the remote device 46 send a response for a bad signal reception to the data transmitting and receiving device 40. The determining step in step S71 is performed repeatedly if the result of the determination is "False". The new de-emphasis is selected to approach the convergence to decrease the NAK frequency according to the range formed by the previous convergence and the original de-emphasis if the result of the determination is "True", which means that the connection quality of the remote device 46 is poor (S72). Then, the total number of the NAK is reset (S73). Therefore, the de-emphasis of the data transmitting and receiving device 40 is adjusted to improve the receiving quality according to the dynamic and directional model for adjusting the de-emphasis. In addition, the adjusting direction is determined first so that there is no risk to be disconnected.

Figure 8A:
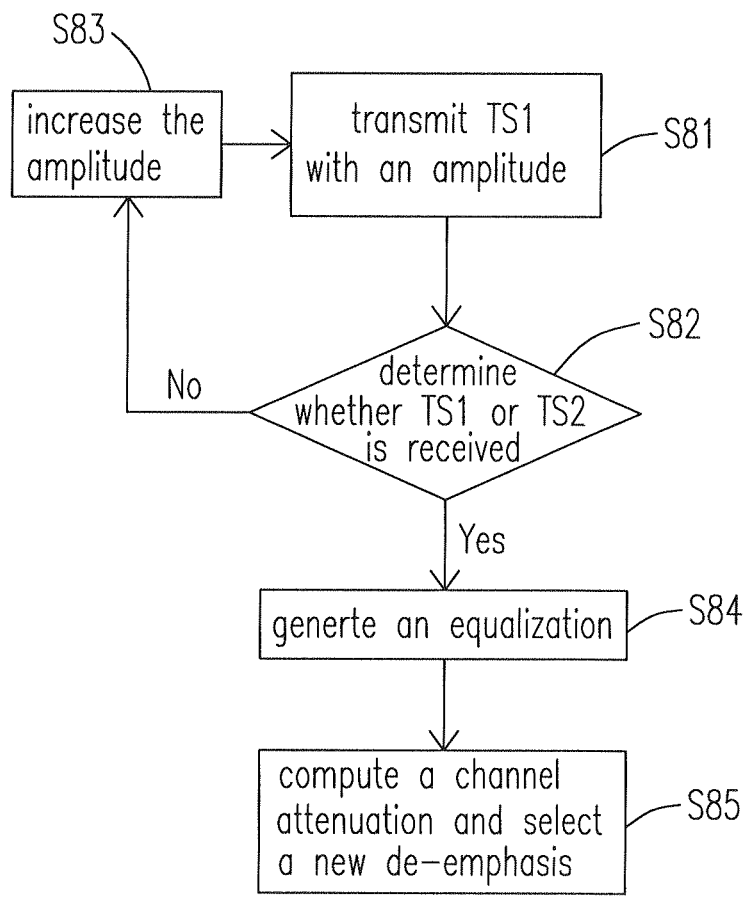
FIGS. 8(a)-(b) are diagrams which schematically illustrate a process for the power saving method of the data transmitting and receiving method according to a preferred embodiment of the present invention.
Figure 8B:
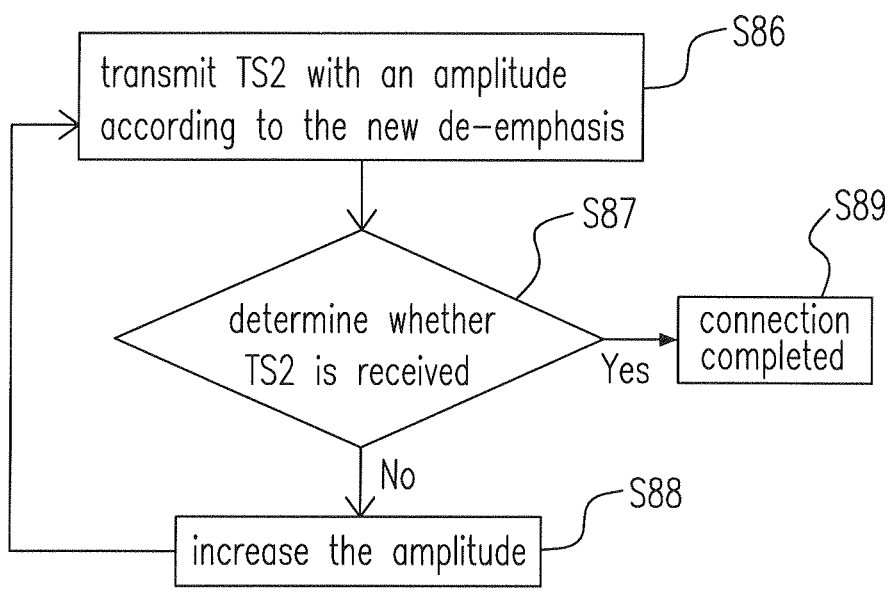

FIG. 8 schematically illustrate the power saving method of the data transmitting and receiving method according to a preferred embodiment of the present invention, wherein FIG. 8(*a*) schematically illustrates a process of setting a new de-emphasis according to the present invention, and FIG. 8(*b*) schematically illustrates a process of setting the amplitude after setting the new de-emphasis according to the present invention. The power saving method of the present invention is performed in the initial connection state and used in a communicating system including the data transmitting and receiving device 40 and the remote device 46, both of which can be a first terminal or a second terminal. For example, a first training sequence (TS1) is used for testing the connection by the data transmitting and receiving device 40 and the remote device 46 if the data transmitting and receiving method can be performed in both of them. Moreover, it should be noted that the following description is from the point of view of the data transmitting and receiving device 40 in FIG. 8(*a*). First, the data transmitting and receiving device 40 transmits the TS1 to the remote device 46 according to an amplitude (S81) and then determines whether the TS1 or a second training sequence (TS2) transmitted from the remote device 46 is received by the data transmitting and receiving device 40 or not (S82). The amplitude should be increased and then the step S81 should be performed again if the determination of the step S82 is "NO" (S83). If the TS1 or the TS2 is received, an equalization can be obtained (S84) to compute a channel attenuation and a new de-emphasis is selected according to the computed channel attenuation (S85). If the TS2 is received by the data transmitting and receiving device 40 in step S82, it should be noted that the remote device 46 first receives the TS1 transmitted by the data transmitting and receiving device 40 to complete the adjustment of the de-emphasis and then transmits the TS2. At that time, the data transmitting and receiving method of the present invention is completed after the data transmitting and receiving device 40 finishes adjusting the de-emphasis and transmits the TS2 to the remote device 46. If the TS1 is received by the data transmitting and receiving device 40 in step S82, it should be noted that the remote device 46 has not received the TS1 transmitted by the data transmitting and receiving device 40 at that time. Moreover, the data transmitting and receiving device 40 should finish the adjustment of the de-emphasis first and then transmit the TS2 to the remote device 46.

According to the above embodiments, the TS1 transmitted by the data transmitting and receiving device 40 has not been received by the remote device 46 if the TS1 transmitted by the remote device 46 is received by the data transmitting and receiving device 40 in the step S82. Please further refer to FIG. 8(*b*). First, the TS2 is transmitted to the remote device 46 with an amplitude according to the selected de-emphasis by the data transmitting and receiving device 40 (S86). Then, the data transmitting and receiving device 40 determines whether the TS2 transmitted by the remote device 40 is received (S87). Preferably, it can be designed to determine whether the data transmitting and receiving device 40 consecutively receives at least N number of the TS2 transmitted by the remote device 46 or not in the step S87, wherein N is an integer. Preferably, the number N is equal to 8. The amplitude of the TS2 of the data transmitting and receiving device 40 is increased gradually and then the step S86 is performed again if the TS2 of the remote device 46 is not received by the data transmitting and receiving device 40 (S88). Finally, the connection is completed if the TS2 of the remote device 46 is received by the data transmitting and receiving device 40 (S89).

According to the above embodiments, the steps S86-S89 have been performed in the remote device 46 if the TS2 is received by the data transmitting and receiving device 40 in the step S82. Furthermore, whether the data transmitting and receiving device 40 is used for being the first terminal or the second terminal, it is included in the above embodiments.

Therefore, whether the first terminal is the data transmitting and receiving device 40 or remote device 46, one of them would receive the TS1, complete the adjustment of the de-emphasis and transmit the TS2 first and then the other would receive the TS2 until the amplitude of the TS2 is high enough to be received. Thus, both of them can receive the TS2 to complete the data transmitting and receiving method of the present invention.

According to the above embodiments, the amplitude of the TS1 transmitted by the remote device 46 is limited by the requirement of the base specification so that the amplitude is high enough to be directly received by the data transmitting and receiving device 40 if the data transmitting and receiving method of the present invention is only performed in the data transmitting and receiving device 40. Therefore, the channel attenuation can be directly computed to generate the new de-emphasis by the data transmitting and receiving device 40 and then the steps in FIG. 8(*b*) are performed therein to complete the data transmitting and receiving method of the present invention.

In the above embodiments, the data transmitting and receiving method includes a first equation being R×A−D, wherein R is a proportional value not larger than 1, A is the channel attenuation, and D is the de-emphasis. Preferably, the proportional value is further larger than 0, i.e. 0<R≤1. The first equation is used for determining whether the de-emphasis should be increased or decreased. Therefore, the first equation is preferably used in step S63 for the determination of the adjusting direction. When the value of the first equation is larger than 0, the new de-emphasis would be the increased de-emphasis. When the value of the first equation is smaller than 0, the new de-emphasis would be the decreased de-emphasis.

In the above embodiments, the data transmitting and receiving method includes a second equation and the second equation is utilized to determine whether the remote device 46 is the same as the data transmitting and receiving device 40 having the automatic adjusting method of the data transmitting and receiving method in the present invention. Therefore, the second equation is preferably used after step S63, step S72 or step S85, which means that the second equation is preferably used after the adjustment of the de-emphasis is finished. The second device is A−E−$D_p$, wherein A is the channel attenuation, E is the equalization, and $D_p$ is a predetermined de-emphasis. If the value of the second equation is not equal to 0, the data transmitting and receiving device 40 would determine that the data transmitting and receiving method can be performed in the remote device 46. If the value of the second equation is equal to 0, the second equation can be utilized to determine whether the data transmitting and receiving method can be performed in the remote device 46 again after the de-emphasis is adjusted again. Preferably, the amplitude of the predetermined de-emphasis of the data transmitting and receiving device 40 and the remote device 46 is preferably equal to 3.5 dB.

Preferably, the method of the present invention is used for PCI Express and the data transmitting and receiving device is a device using a PCI Express. Preferably, the recovery state is a operating state of the device using a PCI Express.

Based on the above descriptions, it would be understood in the present invention that the receivable amplitude of the remote device 46 is dynamically detected to adjust gradually the transmitting power of the data transmitting and receiving device 40 and the de-emphasis of the data transmitting and receiving device 40 is gradually and directionally adjusted according to the setting values thereof to improve the receiving quality of the remote device 46 to satisfy the users' demands.

While the invention has been described in terms of what are presently considered to be the most practical and preferred embodiments, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. A data transmitting and receiving device communicating with a remote device through a channel therebetween, comprising:
   a de-emphasis generator generating a de-emphasis;
   an output unit coupled to the de-emphasis generator and transmitting an output signal to the remote device according to the de-emphasis;
   an input unit receiving an input signal from the remote device;
   an equalizer coupled to the input unit and generating an equalization according to the input signal; and
   a processing unit coupled to the de-emphasis generator and the equalizer and computing a channel attenuation of the channel according to the equalization,
   wherein the de-emphasis generator adjusts the de-emphasis according to the channel attenuation,
   wherein the de-emphasis generator adjusts the de-emphasis according to a proportional value, the de-emphasis is equal to the channel attenuation multiplied by the proportional value, and the proportional value is greater than 0 and less than or equal to 1.

2. The data transmitting and receiving device as claimed in claim 1, wherein the channel attenuation is a sum of an amplitude of a predetermined de-emphasis and an amplitude of the equalization.

3. The data transmitting and receiving device as claimed in claim 2, wherein the amplitude of the predetermined de-emphasis is 3.5 dB.

4. The data transmitting and receiving device as claimed in claim 1, wherein the processing unit controls the de-emphasis generated by the de-emphasis generator.

5. The data transmitting and receiving device as claimed in claim 1, wherein the de-emphasis generator adjusts the de-emphasis according to a range formed by a convergence value and the de-emphasis, the convergence value is equal to the channel attenuation multiplied by the proportional value.

6. The data transmitting and receiving device as claimed in claim 5, wherein the processing unit computes a Negative Acknowledge (NAK) frequency of the data transmitting and receiving device and the de-emphasis generator adjusts the de-emphasis to approach the convergence value if the NAK frequency is decreased.

7. The data transmitting and receiving device as claimed in claim 5, wherein the processing unit computes a Negative Acknowledge (NAK) frequency of the data transmitting and receiving device and the de-emphasis generator ceases to adjust the de-emphasis if there is one of two states being that the NAK frequency is less than a threshold and the de-emphasis is equal to the convergence value.

8. The data transmitting and receiving device as claimed in claim 1, wherein the de-emphasis generator adjusts the de-emphasis according to a first equation, the first equation is R×A−D, R is the proportional value, A is the channel attenuation, and D is the de-emphasis.

9. The data transmitting and receiving device as claimed in claim 8, wherein the de-emphasis generator increases the de-emphasis if a value of the first equation is larger than 0, and the de-emphasis generator decreases the de-emphasis if the value of the first equation is smaller than 0.

10. The data transmitting and receiving device as claimed in claim 1, wherein the data transmitting and receiving device determines whether the remote device is another data transmitting and receiving device according to an equation being A−E−Dp, A is the channel attenuation, E is the equalization, and Dp is a predetermined de-emphasis.

11. The data transmitting and receiving device as claimed in claim 10, wherein an amplitude of the predetermined de-emphasis is 3.5 dB, and the remote device is the another data transmitting and receiving device if a value of the equation is not equal to 0.

12. The data transmitting and receiving device as claimed in claim 1, wherein the output signal has a first amplitude, the input signal is a training signal, and the output unit transmits the output signal to the remote device according to a second amplitude being larger than the first amplitude if the input unit does not receive the training signal.

13. A communicating system, comprising:
a first terminal, comprising:
a first receiving apparatus generating a first receiving property;
a first processing unit coupled to the first receiving apparatus;
a second terminal communicating with the first terminal through a channel, comprising:
a second receiving apparatus generating a second receiving property,
wherein the first receiving property is substantially equal to the second receiving property and the first processing unit computes a channel attenuation of the channel according to the first receiving property,
wherein the first terminal further comprises a first transmitting apparatus coupled to the first processing unit, the first transmitting apparatus generating a first transmitting property and a first output according to the first transmitting property and an input signal,
wherein the first transmitting apparatus adjusts the first transmitting property according to the channel attenuation,
wherein the first output comprises a first amplitude, the first receiving apparatus receives a training signal, and the first transmitting apparatus transmits the first output to the second receiving apparatus according to a second amplitude being larger than the first amplitude if the first receiving apparatus does not receive the training signal.

14. The communication system as claimed in claim 13, wherein the channel attenuation is a sum of the first transmitting property and the first receiving property.

15. The communication system as claimed in claim 14, wherein the second terminal further comprises a second transmitting apparatus and the channel further comprises:
a first channel connecting the first receiving apparatus and the second transmitting apparatus; and
a second channel connecting the first transmitting apparatus and the second receiving apparatus,
wherein the first channel has a first channel attenuation and the second channel has a second channel attenuation being substantially equal to the first channel attenuation.

16. A data transmitting and receiving method for a communicating system, wherein the communicating system comprises a first terminal and a second terminal and there is a channel between the first terminal and the second terminal, comprising steps of:
generating a de-emphasis in the first terminal;
generating an equalization in the first terminal;
computing a channel attenuation of the channel according to the equalization;
adjusting the de-emphasis according to the channel attenuation;
transmitting an output signal to the second terminal according to the adjusted de-emphasis; and
determining whether a total number of Negative Acknowledge (NAK) received within a predetermined time is higher than a first threshold, wherein the de-emphasis is adjusted again to approach a convergence value being equal to the channel attenuation multiplied by a proportional value being greater than 0 and less than or equal to 1, if the total number of NAK is higher than the first threshold.

17. The method as claimed in claim 16, wherein the channel attenuation is a sum of an amplitude of a predetermined de-emphasis and an amplitude of the equalization.

18. The method as claimed in claim 16 further comprising steps of:
determining whether a first input signal transmitted by the second terminal is received;
increasing an amplitude of the output signal transmitted by the first terminal and receiving a second input signal transmitted by the second terminal when it is determined that the first input signal transmitted by the second terminal is not received; and
generating the equalization by the received second input signal.

* * * * *